W. T. BRIDGES.
MULTIPLE CURRENT MOTOR.
APPLICATION FILED FEB. 11, 1910.
1,034,683.
Patented Aug. 6, 1912.
2 SHEETS—SHEET 2.
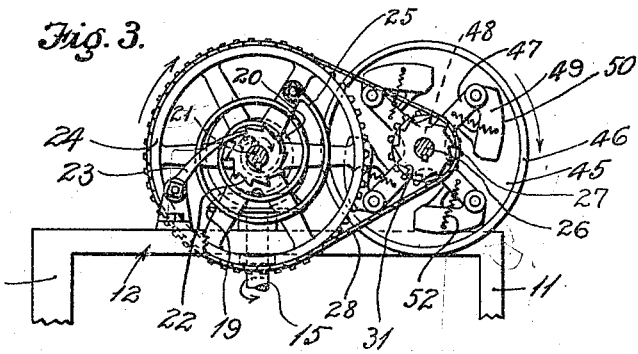
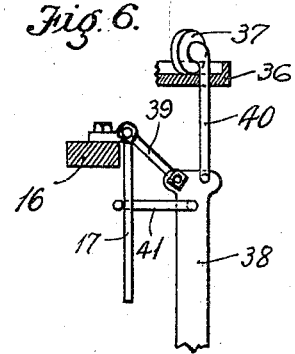
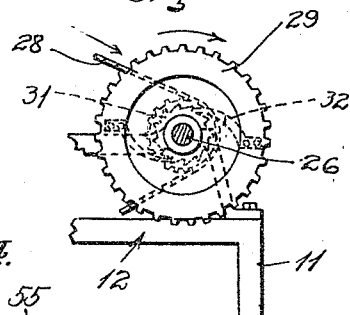
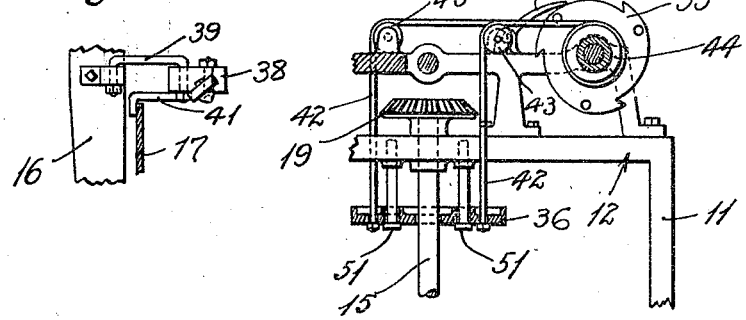
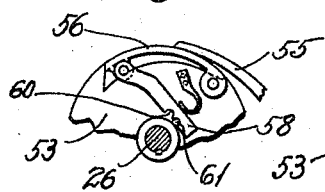
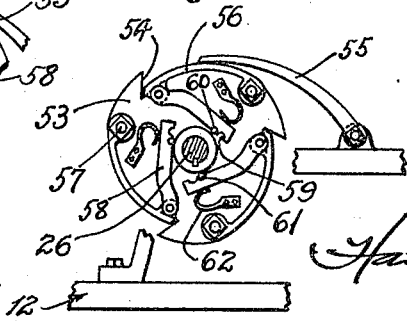
Witnesses.
E. R. Pollard
F. A. Ammen
Inventor:
William T. Bridges
Hazard & Krauze
Attys

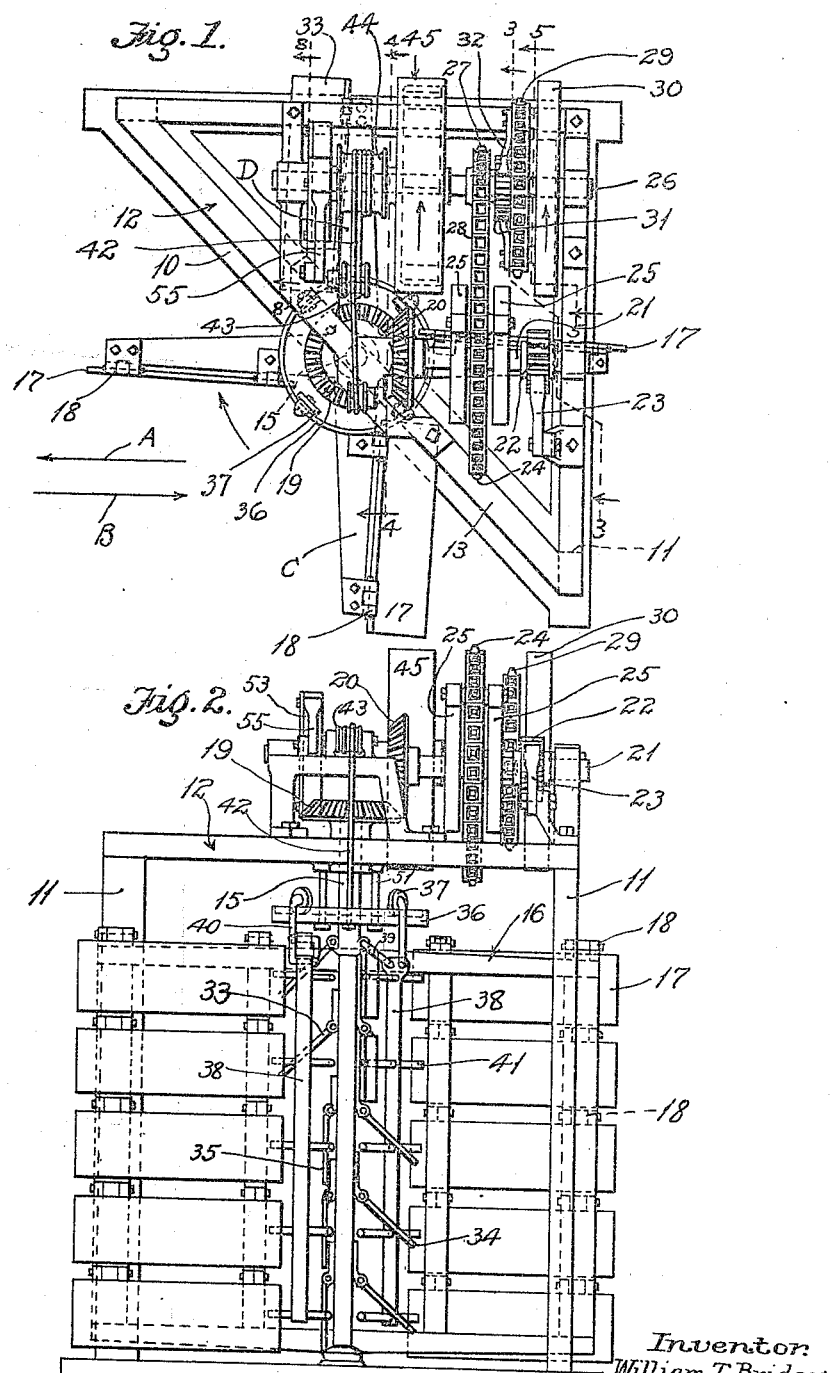

UNITED STATES PATENT OFFICE.

WILLIAM T. BRIDGES, OF LOS ANGELES, CALIFORNIA.

MULTIPLE-CURRENT MOTOR.

1,034,683.

Specification of Letters Patent. Patented Aug. 6, 1912.

Application filed February 11, 1910. Serial No. 543,225.

*To all whom it may concern:*

Be it known that I, WILLIAM T. BRIDGES, a citizen of the United States, residing at Los Angeles, in the county of Los Angeles and State of California, have invented new and useful Improvements in Multiple-Current Motors, of which the following is a specification.

This invention relates to water current motors or wave motors, and is particularly adapted to be operated by currents passing in opposite directions. For this reason it has a special utility as a wave motor when set upon a beach where the waves coming in strike the upper blades of the motor and the undertow current strikes the lower blades. The motor is constructed in such a way that a current acting upon it at any point will tend to drive the motor whatever be the direction of the current, and it is also immaterial at what elevation on the motor the dividing plane between the two currents lies.

The object of the invention is to produce a motor of simple construction which will operate as described and to construct the motor in such a way that the power from the motor can be transmitted at a substantially uniform rate.

A further object of the invention is to provide a motor with governor means which will throw the motor out of operation if it commences to rotate at too high a speed.

In the annexed drawing, which fully illustrates my invention, Figure 1 is a plan of the motor constructed according to my invention. Fig. 2 is a side elevation of the motor shown in Fig. 1. Fig. 3 is a vertical section taken on the line 3—3 of Fig. 1, certain parts being omitted and broken away, this view illustrates particularly the means for transmitting the power from the motor to the driven shaft. Fig. 4 is a vertical section taken on the line 4—4 of Fig. 1 and particularly illustrating the governor means. Fig. 5 is a section taken on the line 5—5 of Fig. 1, and particularly illustrating the connection to the fly wheel from the driven shaft. Fig. 6 is a vertical section showing details of the governing mechanism for raising the blades into an inoperative position. Fig. 7 is a plan of a part of the mechanism shown in Fig. 6, certain parts being broken away. Fig. 8 is a vertical section taken on the line 8—8 of Fig. 1 and illustrating details of the construction of the governing mechanism. This view shows the mechanism arranged in such a way that the governor will throw the wheel out of operation and maintain it out of operation. Fig. 9 is a fragmental view showing a part of the governor wheel which is illustrated in Fig. 8 and illustrating how this governor wheel may be rendered inoperative so that the governor may operate to raise the blades of the motor to an inoperative position, but will not operate to maintain them so.

Referring more particularly to the parts, the frame of the motor comprises a base frame 10 of substantially triangular form and upon this base posts or standards 11 are mounted which support the upper frame 12. As indicated in Fig. 1, these frames 10 and 12 are in the form of right triangles in plan. Between the diagonals or diagonal bars 13 of these frames 10 and 12 a vertical main shaft 15 is rotatably mounted, and this shaft 15 is provided with a plurality of radially disposed arms 16, said arms being in the form of substantially rectangular frames to which a plurality of blades 17 are attached, as indicated. These blades are of rectangular form having their long axes horizontal and extending outwardly on the faces of the frames or arms 16. The upper edges of the blades 16 are connected by hinge joints 18 with the blade frames 16, as shown. It should be understood that these blades are attached so that they tend to hang down at the sides of the blade frames and all of the blades which are attached to one blade frame or arm are attached on the same side thereof. Furthermore the position of the blades on each arm with respect to the direction of rotation is the same for all the arms.

The upper end of the shaft 15 is provided with a bevel gear 19 which meshes with a corresponding bevel gear 20 carried by a counter shaft 21, said counter shaft being mounted in a horizontal position on the upper side of the frame. At the right on the counter shaft 21 as indicated in Fig. 1 it is provided with a ratchet wheel 22 which coöperates with a pawl 23 mounted on the frame, said pawl operating to prevent a backward rotation of this shaft, as will be readily understood. At an intermediate point on the shaft 21 a sprocket wheel 24 is provided loose on the shaft, and on the sides of this sprocket wheel, involute springs 25 are attached. As indicated in Fig. 3, the outer ends of these springs are attached to the sprocket wheel while the inner ends are attached to the shaft 21.

Opposite the counter shaft 21 a driven shaft 26 is mounted parallel therewith on the upper part of the frame, and this shaft 26 is provided with a sprocket wheel 27, which is adapted to be driven by a sprocket chain 28 from the wheel 24, as indicated. On this shaft 26 there is mounted a loose sprocket wheel 29. This sprocket wheel is rigid with a fly wheel 30 mounted loose on the shaft adjacent thereto. The sprocket wheel 29 is adapted to be driven continuously from the shaft when it rotates. The shaft 26 is provided with a rigid ratchet wheel 31 as indicated in Fig. 5, and pawls 32 are attached to the sprocket wheel 29 and engage with the teeth of this ratchet wheel 31 so that when the driven shaft 26 is driven in a forward direction by the chain 28 the sprocket wheel 29 will be rotated in the direction of the arrow shown in Fig. 5. The arrangement is such however, that if the fly wheel 30 should tend to rotate faster than the shaft 26, the pawls 32 will simply slip over the teeth of the ratchet wheel 31 and permit it to rotate faster than the shaft, as will be readily understood.

In the operation of the wheel, it should be understood that the motor is set on a beach where it may be subjected to currents of water moving in opposite directions an inward wave current coming in the direction of the arrow A in Fig. 1, while an outward undertow B moves in the direction of the lower arrow. As illustrated in Fig. 1 the wheel presents four arms, two of which are disposed in the direction of the movement of the currents, and two of which are disposed at right angles to the direction of the movement of the current. When the current A strikes the blades of the arm C, (which is the adjacent arm as viewed in Fig. 2) this current strikes the upper blades 17 and throws them back against the frame to which they are attached, tending to rotate the shaft 15 and the water wheel in the direction of the arrow in Fig. 1. This current however, has no effect on the arm D of the water wheel (which is the remote arm of the wheel as viewed in Fig. 2,) for the current on this side will simply swing the blades 33 toward the rear with respect to the direction of rotation of the wheel. In this way the force of the current is utilized on one side of the wheel, but not on the other side, and in a similar manner the current B operates to advance the wheel. On the arm C it swings back the lower blades 34 without substantially resisting the rotation of the wheel, but on the opposite arm D it closes the blades 35 against the face of the arm and tends to rotate the wheel in a forward direction. In this way by providing a plurality of horizontally arranged blades, the plane between the current coming in and the current going out may be located at any height on the wheel; and the wheel will operate so that the blades that are above this plane will act in unison with each other in a direction to utilize the useful force of the upper current, while the blades below the plane of division between the currents will act in unison and utilize the useful force of the lower current.

I provide means for throwing the blades out of operation by raising them to a substantially horizontal position, if the wheel should tend to rotate too fast. For this purpose I provide on the shaft 15 above the pose of the wheel a sliding collar 36 and arms of the upper side of this collar run a plurality of anti-friction rollers 37. These rollers 37 support a plurality of governor bars 38, which are hung on links 39 upon the arms of the wheel respectively and near their point of attachment to the shaft 15. This arrangement is illustrated very clearly in Figs. 6 and 7. The rollers are connected with the upper ends of the bars by links 40, as shown, and the bars 38 are provided with substantially horizontal fingers 41, which hook behind the edges of the blades in such a way that when the bars swing outwardly and the collar 36 is raised, these fingers 41 will drag the blades up to a substantially horizontal position. I provide means for automatically operating the collar 36. For this purpose I attach pull cords 42 to the opposite sides of the collar as illustrated in Fig. 4, and these cords pass upwardly and pass around guide sheaves 43. From these guide sheaves 43 they pass over to a governor drum 44 about which the pull cords wrap as indicated. This governor drum is rigid with the hub of a governor wheel 45, which is loose on the shaft 26, the governor wheel 45 presents an overhanging rim 46 and in the wheel a governor hub 48 is mounted having radial arms 47, and this hub 48 is rigidly attached to the shaft 26. On the ends of the arms 47 governor weights 49 are pivotally attached which tend to fly outwardly by the action of the centrifugal force and their outer sides present faces 50 which are adapted to come against the inner side of the rim 46 when the governor is operating. In this way by frictional contact with the rim 46 these weights operate as shown, tending to rotate the wheel 45 in the direction of the arrow shown in Fig. 1. This will rotate the drum 44 and draw in the cords 42, in this way the collar 36 will be drawn upward. In order to guide the collar upward I provide guide stems 51 extending down from the upper part of the frame as shown in Fig. 4. The counter weights 49 are provided with springs 52 which connect them with the arms 47 and prevent them from flying outwardly under the action of the centrifugal force.

On the driven shaft 26 I provide a convertible ratchet wheel 53 which consists of a disk having a plurality of notches 54. On this rim coöperating with these notches there is provided, a pawl 55. Under normal conditions these notches 54 are open as indicated in Fig. 8 so that when the governor is operated as described above to raise the collar 36 this pawl will lock the collar in an elevated position, thus the blades of the wheel will be held in a raised or inoperative position. I provide the wheel 53 with means for transforming it into a blank wheel so that the collar 36 may descend to its normal position as soon as the speed of the motor drops again to normal. For this purpose on the edges 50 I provide curved leaves 56 which are pivotally attached by pivot bolts 57. The free ends of these leaves 56 normally lie at the bottoms of the notches 54 as indicated in Fig. 8 so, that the notches are open and operative. At the sides of the leaves 56 links 58 are attached and the inner ends of these links 58 are provided with notches 59 and 60. On the face of the disk pins 61 are provided which are adapted to engage these notches and the links may be held in engagement with the pins by springs 62 secured on the disk behind them as shown. When the links are arranged with the notches 60 in engagement with the pins, the leaves make the notches 54 operative, but if the leaves are swung outwardly and the notches 59 applied to the pins, the notches 54 will be filled or rendered blank. This arrangement is illustrated in Fig. 9 where it will be seen that when the leaves are disposed outwardly in this manner their outer faces form continuations of the periphery of the wheel so that the wheel 53 becomes to all intents and purposes a blank disk; it will then be unaffected by the pawl with which it normally coöperates.

By providing the springs 25 it will be seen that the energy developed by the rotation of the water wheel will be resiliently imparted to the ratchet wheel 24. The springs 25 react against the pawl 23 which prevents the shaft from rotating backwardly. The springs 25 absorb shocks which otherwise might be imparted from the blades 17 to the machinery, which shocks might occur from floating ice or obstructions passing down in the current. In this way the springs operate to prevent injury to the mechanism, and they also operate as equalizers to rotate the driven shaft at a substantially uniform speed, although the speed of the wheel in the current may vary considerably.

Having described my invention what I claim as new and desire to secure by Letters Patent is:

1. In a water current motor in combination, a frame, a vertical shaft mounted in said frame, a plurality of arms radially mounted on said shaft, a plurality of blades having hinge connections with said arms adapted to hang down from said hinge connections, said blades being attached on the same side of said arms with respect to the direction of rotation, a counter shaft driven by said first shaft, a governor driven by said counter shaft, and members resting against said blades but unattached thereto for controlling the position of said blades through said governor, said members permitting the independent movement of said blades by the reverse water current.

2. In a water current motor in combination, a frame, a vertical shaft, a plurality of arms extending radially from said shaft, a plurality of blades having hinge connections with said arms adapted to hang down from said hinge connections, a counter shaft driven from said shaft, a governor driven from said counter shaft, a sliding collar mounted on said first shaft, and members controlled by said sliding collar for connecting the same with said blades to raise said blades through the operation of said governor, said members being unattached to said blades so as to permit the independent movement thereof by the reverse current.

3. In a water current motor in combination, a frame, a vertical shaft mounted in said frame, a plurality of arms extending substantially radially from said shaft, a plurality of blades having hinge connections with said arms normally hanging down from said hinge connections, a counter shaft driven from said first shaft, a governor driven from said counter shaft, a collar sliding on said first shaft, bars extending downwardly from said collar and supported thereby, fingers carried by said bars engaging said blades but unattached thereto and adapted to raise the same when said collar is raised, and a connection between said governor and said collar.

4. In a water current motor in combination, a frame, a shaft mounted in said frame, blades supported by said shaft and adapted to rotate the same, a ratchet wheel driven from said shaft, a fly wheel mounted coaxially with said ratchet wheel, and pawls connected with said fly wheel and engaging said ratchet wheel, said pawls affording means for rotating said fly wheel and permitting the rotation of said fly wheel faster than said ratchet wheel.

5. In a water current motor in combination, a frame, a vertical shaft mounted therein, blades supported by said shaft and adapted to rotate the same, a counter shaft driven from said first shaft, means for preventing a backward rotation of said counter shaft, a wheel mounted loosely on said counter shaft, springs for driving said wheel from said counter shaft, a driven shaft opposite said counter shaft, means for driving the same from said wheel, a fly wheel loose on said driven shaft, and means for driving said fly wheel in a forward direction from said driven shaft and permitting a faster rotation of said fly wheel than said driven shaft.

6. In a water current motor in combination, a frame, a water wheel mounted in said frame and adapted to be rotated by a water current, said wheel having a plurality of blades having hinged connections therewith, a governor, means for driving said governor from said wheel, means connecting said governor with said blades but unattached to said blades to raise the same when said wheel attains an abnormal speed, and means for locking said blades against return to their normal position.

7. In a water current motor in combination, a frame, a water wheel mounted therein, a plurality of blades having hinged connections with said wheel, a drum, a governor driven from said wheel and controlling said drum, a cord passing around said drum and adapted to raise or lower said blades, a ratchet wheel rotating with said drum, and a pawl coöperating with said ratchet wheel to lock said drum against reverse movement.

8. In a water current motor in combination, a frame, a water wheel mounted therein, a plurality of blades having hinged connections with said wheel, a drum, a governor driven from said wheel and controlling said drum, a cord passing around said drum and adapted to raise or lower said blades, a ratchet wheel rotating with said drum, a pawl coöperating with said ratchet wheel to lock said drum against reverse movement, said ratchet wheel having notches in the edge thereof coöperating with said pawl, and movable leaves mounted adjacent to said notches and adapted to be secured so as to close said notches and render said wheel blank.

In witness that I claim the foregoing I have hereunto subscribed my name this 4th day of February, 1910.

WILLIAM T. BRIDGES.

Witnesses:
F. D. AMMEN,
EDMUND A. STRAUSE.